3,166,596
MANUFACTURE OF TRIMETHYLENE DIAMINE AND N-PROPYLAMINE
Arthur F. Miller, Cleveland, and Wilfred B. Howsmon, Jr., Marietta, Ohio, assignors to The Standard Oil Company, Cleveland, Ohio, a corporation of Ohio
No Drawing. Filed May 3, 1962, Ser. No. 192,044
10 Claims. (Cl. 260—583)

The present invention relates to a process for the simultaneous manufacture of trimethylene diamine and n-propylamine. According to the process of this invention a mixture comprising acrylonitrile, hydrogen and aqueous ammonia is reacted under relatively mild conditions in the presence of a hydrogenation catalyst to yield the desired products.

It has been suggested in the prior art that trimethylene diamine may be prepared from acrylonitrile by reacting acrylonitrile with an excess of anhydrous ammonia and subsequently hydrogenating the resulting reaction product in the presence of a hydrogenation catalyst. According to this suggestion the catalyst is conventional and it may be selected from the metals of Groups V to VIII of the Periodic System or their compounds, for example the oxides of sulphides of these metals and their alloys may be employed in carrying out this process. Preferred catalysts are cobalt and/or nickel or their compounds especially the oxides of these metals. The suggested reaction conditions are temperatures in the range of 20 to 200° C. and pressures on the order of 15 to 500 atmospheres. According to this teaching the best results are obtained when a fairly substantial excess of ammonia is present in the reaction mixture.

Experiments conducted following this suggestion of the prior art have shown that the activity of the catalyst diminishes rapidly upon use and in order to obtain the optimum results it is necessary as a practical matter to prepare each batch of trimethylene diamine with a catalyst which is fresh or one that is nearly so. Accordingly, a method of producing trimethylene diamine from acrylonitrile which is not attended by a loss of activity of the catalyst would obviously be economically advantageous and it is the principal object of this invention to provide such a process. Another object of this invention is to provide a process for the simultaneous production of trimethylene diamine and n-propylamine.

In brief, the process of this invention is carried out by reacting a mixture comprising acrylonitrile, aqueous ammonia and hydrogen in the presence of a hydrogenation catalyst under relatively mild reaction conditions which will be described more fully hereinafter.

It was quite surprising and unexpected to find that the addition of even a minor amount of water to the reaction mixture was successful in preventing any substantial loss of activity of the hydrogenation catalyst. The manner in which the water behaves in the system is not fully understood but it has been hypothesized that the water serves as a catalyst in the cyanoethylation of ammonia since it has been observed that the ammonia and acrylonitrile react much more rapidly in the presence of water. The theory which explains the function of the water is unimportant to an understanding of this invention, since the observed phenomena clearly show the advantageous results which are derived by the addition of water to the reaction mixture.

The hydrogenation catalyst which is employed in the process of this invention may be selected from the metals of Groups V to VIII of the Periodic Table or their compounds. Catalysts based on nickel and cobalt have been found to be particularly useful in the process, as for example Raney nickel, Raney cobalt, Raney cobalt-aluminum alloy, Raney nickel alloy, Raney nickel-chromium-aluminum alloy and cobalt-copper powder. The methods by which these catalysts are prepared are not critical and any of the well-known methods of preparing such catalysts may be employed. If desired the catalyst may be used in conjunction with a support material which is inert under the process conditions.

The nature of the catalyst employed in the process appears to have a pronounced influence on the kind and the amount of amine which will be produced. If a substantial amount of n-propylamine as well as trimethylene diamine is desired, a catalyst based on nickel should be employed. On the other hand, if it is desired to minimize the production of n-propylamine, a catalyst based on cobalt should be employed in the process. It should be clearly understood, however, that the use of either the nickel or cobalt catalysts will result in the production of both trimethylene diamine and n-propylamine and that the choice of the catalyst will affect only the relative amounts of each compound which will be produced.

One variable in the process is the weight ratio of the catalyst to acrylonitrile. In general higher ratios of catalyst to acrylonitrile result in an increase in the amount of n-propylamine produced with an attendant decrease in the amount of trimethylene diamine produced. It appears that the optimum results from the standpoint of the production of a maximum amount of trimethylene diamine are obtained when the weight ratio of catalyst to acrylonitrile is about 0.2.

The process may be carried out at reactor temperatures in the range of 50 to 350° C., and preferably between 75 to 125° C. The pressure within the reactor should be in the range of 15 to 200 atmospheres and preferably in the range of 25 to 50 atmospheres. In order to insure that the reaction will go to completion, reaction times on the order of about 1 to 5 hours should be employed.

One of the more important variables in the process is the ratio of ammonia to acrylonitrile. In general, the molar ratio of ammonia to acrylonitrile should be in the range of 5:1 to about 40:1, and a preferred ratio for the production of trimethylene diamine appears to be about 20:1. Ratios near the upper end of the stated range favor the production of trimethylene diamine at the expense of n-propylamine.

The amount of water which is to be added to the reaction mixture must be carefully controlled. The lower limit on the amount of water is not critical and even very small amounts will serve to prolong catalyst life. However, there is a critical upper limit on the amount of water since, if too much water is added to the reaction mixture, the production of trimethylene diamine will be substantially precluded and the product will be primarily made up of n-propylamine. Hence, the amount of water added to the reaction mixture, expressed in relation to the amount of ammonia present, should not exceed about 10 moles of water per mole of ammonia. For convenience, it may be desirable to employ a commerical aqueous ammonia (28% by weight $NH_3$) as a raw material in the process and this will give a ratio of 2.31 moles of water per mole of ammonia.

In general, the process is conducted in a batch reaction vessel, with relatively pure hydrogen being used both to pressurize the system and to provide the hydrogen necessary to the formation of the desired end products. The product mixture obtained in the process may be worked up by conventional separation techniques such as fractional distillation in order to recover and separate trimethylene diamine and n-propylamine. Unreacted ammonia, acrylonitrile and hydrogen may be recovered from the product mix and recycled in the process.

In order to illustrate the effect of the presence of water on the activity of the catalyst, a series of batch reactions were conducted employing a conventional Raney nickel catalyst. In the first series which is illustrative of the prior art, liquid anhydrous ammonia was employed. The weight ratio of catalyst to acrylonitrile was 0.183 and the molar ratio of ammonia to acrylonitrile was 31. During these runs, the temperature of the reactor was maintained at 225° F. and it was pressured to 3000 p.s.i.g. with hydrogen. A uniform reaction time of two hours was allowed for each batch. The results, measured in terms of the percent of acrylonitrile converted to trimethylene diamine and n-propylamine, are reported in the following table.

Table I

| Batch No. | Trimethylene Diamine, percent | n-Propylamine, percent |
| --- | --- | --- |
| 1 | 20.3 | 22.4 |
| 2 | 21.2 | 5.2 |
| 3 | 6.65 | 1.1 |
| 4 | 2.2 | 0 |

In a second series of runs which are illustrative of the present invention, an aqueous ammonia solution (28% by weight NH$_3$) was substituted for the liquid anhydrous ammonia. The weight ratio of catalyst to acrylonitrile was 0.188 and the molar ratio of ammonia to acrylonitrile was 20.4. The temperature of the reactor was maintained at about 250° F. and the reactor was pressured to about 500 p.s.i.g. with hydrogen. A uniform reaction time of two hours was allowed for each batch. The results, reported on the same basis used in Table I, are set forth in the following table:

Table II

| Batch No. | Trimethylene Diamine, percent | n-Propylamine, percent |
| --- | --- | --- |
| 1 | 51.6 | 3.4 |
| 2 | 62.5 | 11.5 |
| 3 | 58.3 | 16.0 |
| 4 | 51.0 | 19.0 |
| 5 | 60.0 | 15.9 |
| 6 | 56.6 | 20.2 |
| 7 | 41.4 | 14.2 |
| 8 | 48.0 | 19.3 |
| 9 | 52.0 | 19.2 |
| 10 | 63.0 | 18.0 |
| 11 | 61.2 | 17.4 |

An examination of the data in Table I reveals that, when liquid anhydrous ammonia is employed, the activity of the catalyst falls off rapidly so that after only four batches the activity of the catalyst is almost nil. On the other hand, the data in Table II show that the catalyst does not undergo any appreciable decline in activity even after eleven batches have been run when water is added to the reaction mixture in accordance with the teachings of this invention. Moreover, the presence of water in the reaction mixture appears to afford a marked improvement in the amount of acrylonitrile which is converted to the desired end products, i.e. trimethylene diamine and n-propylamine.

As mentioned in the preceding paragraph, an additional advantage of the process of this invention is that the addition of even a small amount of water to the reaction mixture significantly improves the yield of trimethylene diamine. In order to illustrate this point, two runs were conducted with a Raney nickel catalyst. Both of these runs were conducted under the following conditions:

Reaction time—2 hours
Hydrogen pressure—2850 p.s.i.g.
Ammonia/acrylonitrile molar ratio—31
Catalyst/acrylonitrile wt. ratio—0.188
Temperature—233° F.

However, in Batch A anhydrous ammonia was employed whereas in Batch B sufficient water was added to the reaction mixture to provide a molar ratio of water to acrylonitrile of 0.1. The results are reported in the following table:

Table III

| Batch | Percent Conversion to trimethylene diamine | Percent Conversion to n-propylamine |
| --- | --- | --- |
| A | 20.3 | 22.4 |
| B | 66.6 | 19.3 |

Hence, this data shows that the yield of trimethylene diamine is improved more than three-fold by the addition of a small amount of water to the reaction mixture.

Undoubtedly many modifications of the process described herein will occur to those skilled in the art, and this application for Letters Patent is intended to encompass all such modifications as would reasonably fall within the scope of the appended claims.

We claim:

1. A process for the simultaneous production of trimethylene diamine and n-propylamine which comprises the step of reacting at a temperature in the range of 50 to 350° C. and a pressure of 15 to 200 atmospheres a mixture of acrylonitrile, ammonia, and hydrogen in the presence of a hydrogenation catalyst and water, said water being present in not more than about 10 moles per mole of ammonia.

2. A process for the simultaneous production of trimethylene diamine and n-propylamine which comprises the step of reacting at a temperature in the range of 50 to 350° C. and a pressure of from 15 to 200 atmospheres for from 1 to 5 hours a mixture of acrylonitrile, ammonia, and hydrogen in the presence of a Raney nickel hydrogenation catalyst and water, said water being present in not more than about 10 moles per mole of ammonia.

3. A process for the simultaneous production of trimethylene diamine and n-propylamine which comprises the step of reacting at a temperature in the range of 50 to 350° C. and a pressure of from 15 to 200 atmospheres for from 1 to 5 hours a mixture of acrylonitrile, ammonia, and hydrogen in the presence of a Raney cobalt hydrogenation catalyst and water, said water being present in no more than about 10 moles per mole of ammonia.

4. A process for the production of trimethylene diamine which comprises the step of reacting at a temperature in the range of 50 to 350° C. and a pressure of from 15 to 200 atmospheres a mixture of acrylonitrile, ammonia, and hydrogen in the presence of a hydrogenation catalyst and water, said water being present in not more than about 10 moles per mole of ammonia.

5. A process for the production of trimethylene diamine which comprises the step of contacting a mixture of acrylonitrile, ammonia, water and hydrogen said water being present in no more than 10 moles per mole of ammonia with a hydrogenation catalyst at a temperature in the range of 75 to 125° C. and at a pressure in the range of 15 to 200 atmospheres.

6. A process for the production of trimethylene diamine which comprises the step of contacting a mixture of acrylonitrile, ammonia, water and hydrogen with a hydrogenation catalyst at a temperature in the range of 75 to 125° C. and at a pressure in the range of 25 to 50 atmospheres for from 1 to 5 hours, said mixture having a molar ratio of water to ammonia below about 10:1.

7. A process for the simultaneous production of trimethylene diamine and n-propylamine which comprises the step of contacting a mixture of acrylonitrile, ammonia, water and hydrogen with a Raney nickel hydrogenation catalyst at a temperature in the range of 75 to 125° C. and at a pressure in the range of 25 to 50 atmospheres for from 1 to 5 hours, said mixture having a molar ratio of water to ammonia below about 10:1.

8. A process for the simultaneous production of trimethylene diamine and n-propylamine which comprises the step of contacting a mixture of acrylonitrile, ammonia, water and hydrogen with a Raney cobalt hydrogenation catalyst at a temperature in the range of 75 to 125° C. and at a pressure in the range of 25 to 50 atmospheres for from 1 to 5 hours, said mixture having a molar ratio of water to ammonia below about 10:1.

9. A process for the production of n-propylamine which comprises the step of reacting at a temperature of from 75 to 125° C. and at a pressure of from 25 to 50 atmospheres for a period of from 1 to 5 hours acrylonitrile and hydrogen in the presence of a hydrogenation catalyst and aqueous ammonia mixture, said mixture having a molar ratio of water to ammonia below about 10:1.

10. A process for the production of n-propylamine which comprises the step of reacting at a temperature of from 75 to 125° C. and at a pressure of from 25 to 50 atmospheres for a period of from 1 to 5 hours acryionitrile and hydrogen in the presence of a Raney nickel hydrogenation catalyst and aqueous ammonia mixture, said mixture having a molar ratio of water to ammonia below about 10:1.

References Cited in the file of this patent

UNITED STATES PATENTS 2,287,219  Young et al. _____ June 23, 1942

FOREIGN PATENTS 824,535  Great Britain _____ Dec. 2, 1959